(12) United States Patent
Nebel

(10) Patent No.: US 9,238,311 B2
(45) Date of Patent: Jan. 19, 2016

(54) AIRBAG MODULE AND METHOD FOR PRODUCING SAME

(71) Applicant: Autoliv Development AB, Vårgårda (SE)

(72) Inventor: Raimund Nebel, Obermeitingen (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 14/399,122

(22) PCT Filed: May 10, 2013

(86) PCT No.: PCT/EP2013/001399
§ 371 (c)(1),
(2) Date: Nov. 5, 2014

(87) PCT Pub. No.: WO2013/167285
PCT Pub. Date: Nov. 14, 2013

(65) Prior Publication Data
US 2015/0108740 A1    Apr. 23, 2015

(30) Foreign Application Priority Data

May 10, 2012   (DE) .......................... 10 2012 009 401

(51) Int. Cl.
*B29C 35/08* (2006.01)
*B60R 21/217* (2011.01)
*B29K 105/24* (2006.01)

(52) U.S. Cl.
CPC ......... *B29C 35/0866* (2013.01); *B29C 35/0805* (2013.01); *B60R 21/217* (2013.01); *B29C 2035/085* (2013.01); *B29C 2035/0844* (2013.01); *B29C 2035/0877* (2013.01); *B29K 2105/24* (2013.01); *B60R 2021/2178* (2013.01)

(58) Field of Classification Search
CPC ............ B29C 35/0866; B29C 35/0805; B29C 2035/085; B29C 2035/0877; B29C 2035/0844; B60R 21/217; B60R 2021/2178; B29L 2031/3038; B29K 2105/24
See application file for complete search history.

(56) References Cited

U.S. PATENT DOCUMENTS

| | | | | |
|---|---|---|---|---|
| 6,062,590 A | * | 5/2000 | Gallagher | ................ 280/728.1 |
| 6,210,797 B1 | * | 4/2001 | Sato et al. | ...................... 428/357 |
| 2002/0145276 A1 | * | 10/2002 | Veiga | ......................... 280/743.1 |
| 2005/0079305 A1 | * | 4/2005 | Krappmann | ................. 428/35.7 |
| 2008/0012272 A1 | * | 1/2008 | Haertel et al. | ............. 280/728.2 |

FOREIGN PATENT DOCUMENTS

| | | |
|---|---|---|
| DE | 697 11 635 T2 | 9/2002 |
| DE | 103 29 380 A1 | 1/2005 |
| DE | 10 2012 009 401 B4 | 3/2014 |
| EP | 1 967 422 A1 | 9/2008 |

OTHER PUBLICATIONS

International Search Report—Jul. 9, 2013.
German Examination Report—Jan. 2, 2013.

* cited by examiner

*Primary Examiner* — Drew Brown
(74) *Attorney, Agent, or Firm* — Brinks Gilson & Lione

(57) ABSTRACT

An air bag module (5) having an air bag (10), a receiving and retaining element (20) to receive and hold the air bag and an inflator to fill the air bag. To increase the thermal stability the air bag (10) and/or the receiving and retaining element (20) consist at least in part of a radiation crosslinked plastic, in particular of a radiation crosslinked thermoplastic.

15 Claims, 5 Drawing Sheets

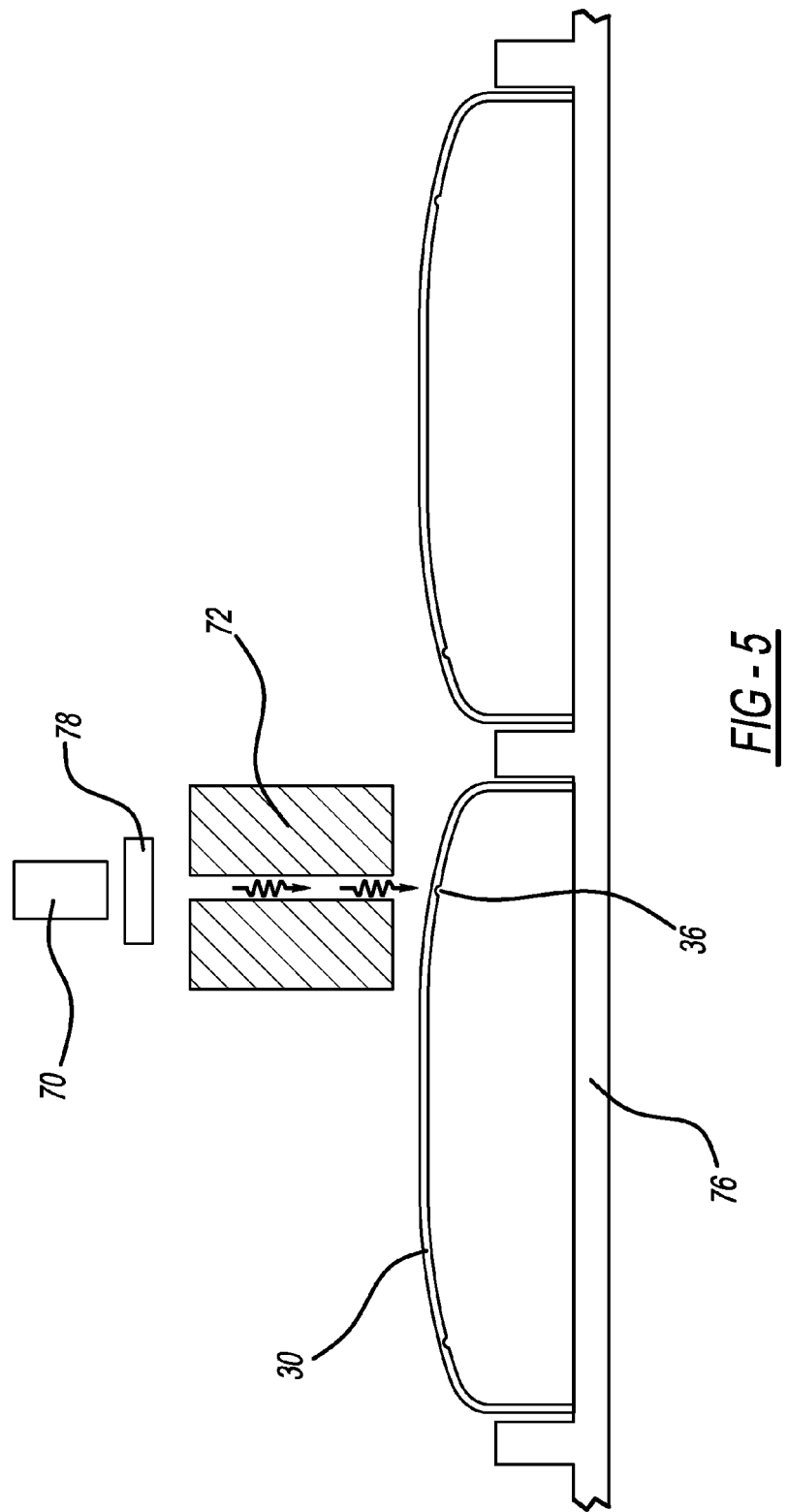

AIRBAG MODULE AND METHOD FOR PRODUCING SAME

CROSS REFERENCE TO RELATED APPLICATIONS

This application relates to German Patent Application No. 10 2012 009 401.9, filed on May 10, 2012 and PCT International Patent Application No. PCT/EP2013/001399, filed on May 10, 2013.

FIELD OF THE INVENTION

The invention relates to an air bag module for motor vehicle applications as well as to a procedure for its manufacture.

BACKGROUND

An air bag module intended for installation in a vehicle, in particular a front air bag module, consists of an air bag, a receiving and retaining element to receive and hold an air bag, and an inflator to fill the air bag. In this connection, a gas generator is frequently used as an inflator, in particular, a hot gas generator in which a pyrotechnic charge that on ignition produces a large quantity of hot gas which fills the air bag.

Originally, large parts of the receiving and retaining element, namely in particular the housing, a possibly provided retaining ring, and a possibly provided diffuser, were made of metal. In the meantime, for cost and weight reasons, many parts which were originally made of metal are now made of plastic, and it is possible to provide plastics and geometries which meet the current mechanical and thermal requirements. Small and very hot gas generators are, however, increasingly being developed which, in particular, have the advantage of a low weight. It has turned out in laboratory tests that the temperatures which are reached with the use of such generators may give rise to problems if certain components of the receiving and retaining elements are made of the thermoplastics that have been used so far. The following components or sections of the receiving and retaining elements can, in particular, be affected: the housing floor/base plate, especially in the area in which the gas generator is held by means of its flange; any possibly provided retainer ring; any possibly provided diffuser; any possibly provided deflector, (flame retardant wall).

In view of the foregoing, the object of the present invention is to provide an air bag module in which temperature-exposed components can also be made of plastic when very hot gas generators are used.

This object is attained by an air bag module described herein, and a process, with which such an air bag module can be manufactured, is also described.

In order to solve the design challenges mentioned above, it would be basically possible to use high temperature resistant plastics, in particular, high-temperature resistant polyamides. That would, however, entail critical disadvantages since, on the one hand, such materials have a low notched impact strength and, in addition, high tool temperatures will also be required during injection molding. This, on the one hand, increases the energy consumption during injection molding and also reduces the service life of the tools used. This would lead to a significant increase in the cost of the air bag module, which are reasons why this approach has not been adopted in the present invention. Instead, according to the present invention, at least one component of the air bag module consisting of plastic is radiation crosslinked after shaping. In the process, the plastic—which, in particular, is a thermoplastic—can have a so-called cross-linking activator. The production, in particular the injection molding, requires no special process; in particular, common tools with common temperature control may be used. In a process step which preferentially is interposed between the production steps, in particular, injection molding of this part, and the final assembly of the air bag module, the component is exposed to ionizing radiation, namely, in particular, to gamma or beta radiation, whereby the plastic material is crosslinked. This crosslinking is also called radiation crosslinking. This crosslinking (radiation crosslinking) also results, among other things, in that the thermal stability, in particular the short-term thermal stability, of the plastic definitely increases compared to its non-crosslinked original condition. Thus, for example, the thermal stability of PA-6.6 GF 30 increases from about 250° C. to about 360° C. and that of PA-6 GF 30 from about 200° C. to about 350° C.

The required irradiation is not a very expensive process step and can, in particular, take place in that a large number of components to be irradiated are irradiated in a large container lying loose therein. Such a process is known, for example, from the production of plugs, namely when plastic encapsulations of plug connectors are radiation crosslinked in order to withstand high soldering temperatures.

The main application of the invention could lie in the field described above, namely with the objective of making components of a receiving and retaining element more temperature-resistant. It has turned out, however, that the invention can also be applied in the area of air bag modules. It is thus, for example, possible to radiation crosslink at least one section of the air bag, in particular at least one reinforcing layer surrounding the inflation inlet in order to increase its thermal stability. According to the current state of knowledge, however, radiation crosslinking sections or elements of the air bag module only makes sense if this element or section consists of a laminate, since in a fabric the filaments are too thin for radiation crosslinking. It can, in particular, be very useful to use at least one radiation crosslinked laminate in the area of the inflation inlet, since a flame retardant can be provided very cost-effectively in this manner, which can make the use of a silicon coating unnecessary, or result in an even higher thermal stability in conjunction with a silicone coating. The volume of exhaust gas, which can be generated by scorching of the air bag fabric, can be reduced in this way.

A completely different application can consist of selectively radiation crosslinking the predetermined breaking lines of the housing cover, since radiation crosslinking not only leads to an increase of the thermal stability but also to an increase of the brittleness which can have a favorable effect on the controlled opening behavior of the exits doors.

BRIEF DESCRIPTION OF THE DRAWINGS

Preferred embodiments of the invention will be apparent from the written description of the exemplary embodiments to be now described in more detail with reference to the figures, which show:

FIG. 5 is a schematic depiction of selective radiation crosslinking.

DETAILED DESCRIPTION OF THE INVENTION

Figure 1:
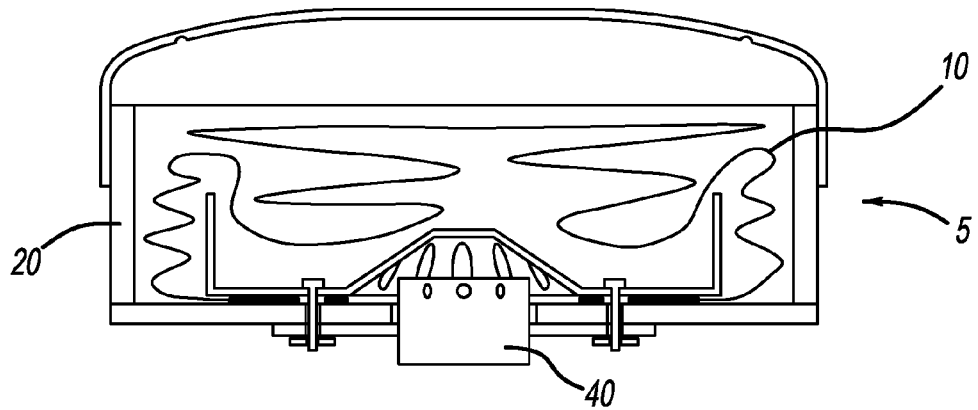
FIG. 1 is a schematic sectional view of a completely mounted air bag module.
Figure 2:
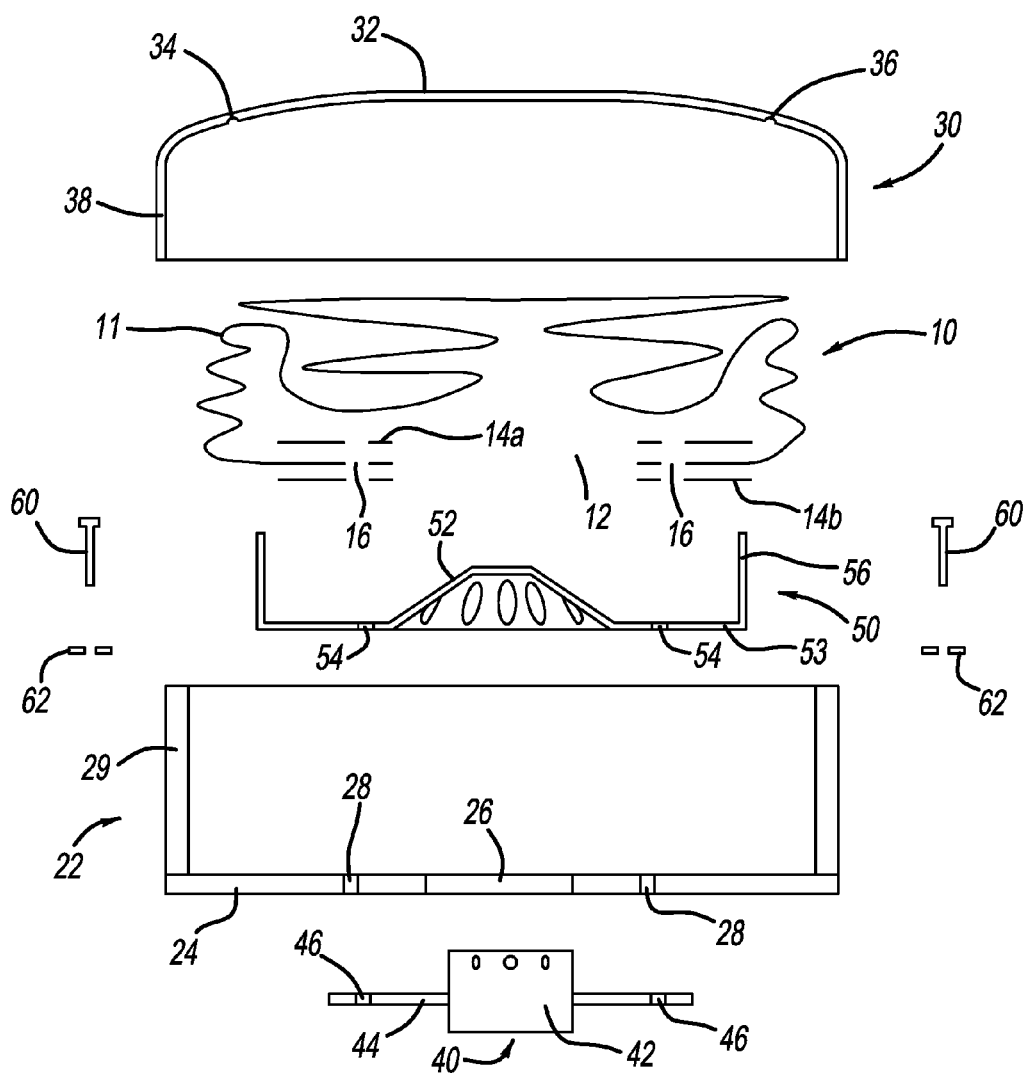
FIG. 2 shows all the components of the air bag module from FIG. 1.

FIG. 1 shows a completely mounted air bag module; FIG. 2 shows the corresponding individual parts. Such an air bag module is known generally. With regard to the present invention, the air bag module can be seen as basically consisting of three functional elements, namely the air bag 10, the receiving and retaining element 20, and the gas generator 40 used as inflator. Bolts 60 with nuts 62 or appropriate crimps are used to connect these functional elements.

The air bag 10 consists of an air bag pillow 11 and two reinforcing layers 14a, 14b which surround the inflation inlet 12 of the air bag pillow 11 and are connected to the air bag pillow 11, in particular, sewn, glued or welded. The air bag pillow 11 consists of a plastic fabric; the reinforcing layers 14a, 14b consist of a plastic laminate. In the shown embodiment, the receiving and retaining element 20 have three individual elements, namely at least one housing 22, usually designated as a container, a covering element 30 usually designated as a cover, and a retaining, diffusing and deflecting element 50. The housing has a housing base 24 and a side wall 29. The cover element 30 is held on the side wall 29 of the housing (as a rule, by means of snap-in connections—not shown). This cover element 30 in turn has two sections, namely the roof 32 and a side wall 38. A hinge line 34 and a predetermined breaking line 36, which are each configured as interior grooves, are arranged in the roof 32 in a known manner. The retaining, diffusing and deflecting element 50, which has a dome-like diffuser 52, a base section 53 and a deflector 56, is arranged on the housing base 24. This retaining, diffusing and deflecting element 50 has several functions, namely, first, to hold the air bag 10 on the housing base 24 and protect the air bag, the diffuser 52 and the deflector 56 being used for that purpose.

The gas generator 40 has a gas generation section 42 and a flange 44. The gas generation section 42 protrudes into the housing 22 through a central opening 26 in the housing base 24, where it is spanned by the diffuser 52. The bolts 60 are used to hold together the air bag 10, the housing base 24, the retaining, diffusing and deflecting element 50 and the flange 44 which extend through corresponding mounting holes 16, 28, 46 and 54 with the nuts 62 screwed thereon. It could also be possible that the bolts and the nuts are part of a composite part. In the shown exemplary embodiment, the retaining, diffusing and deflecting element 50 could be considered for this purpose. In such a composite part, the plastic is sprayed onto at least one corresponding metal part. It is important for the following that all the components of the receiving and holding element 20 in this exemplary embodiment consist at least in part of plastic, in particular in particular of thermoplastics. In this case, each component can consist of a different plastic, since the components should have different properties. The components of the air bag 10 consist of a plastic fabric and of a plastic laminate.

Figure 3:
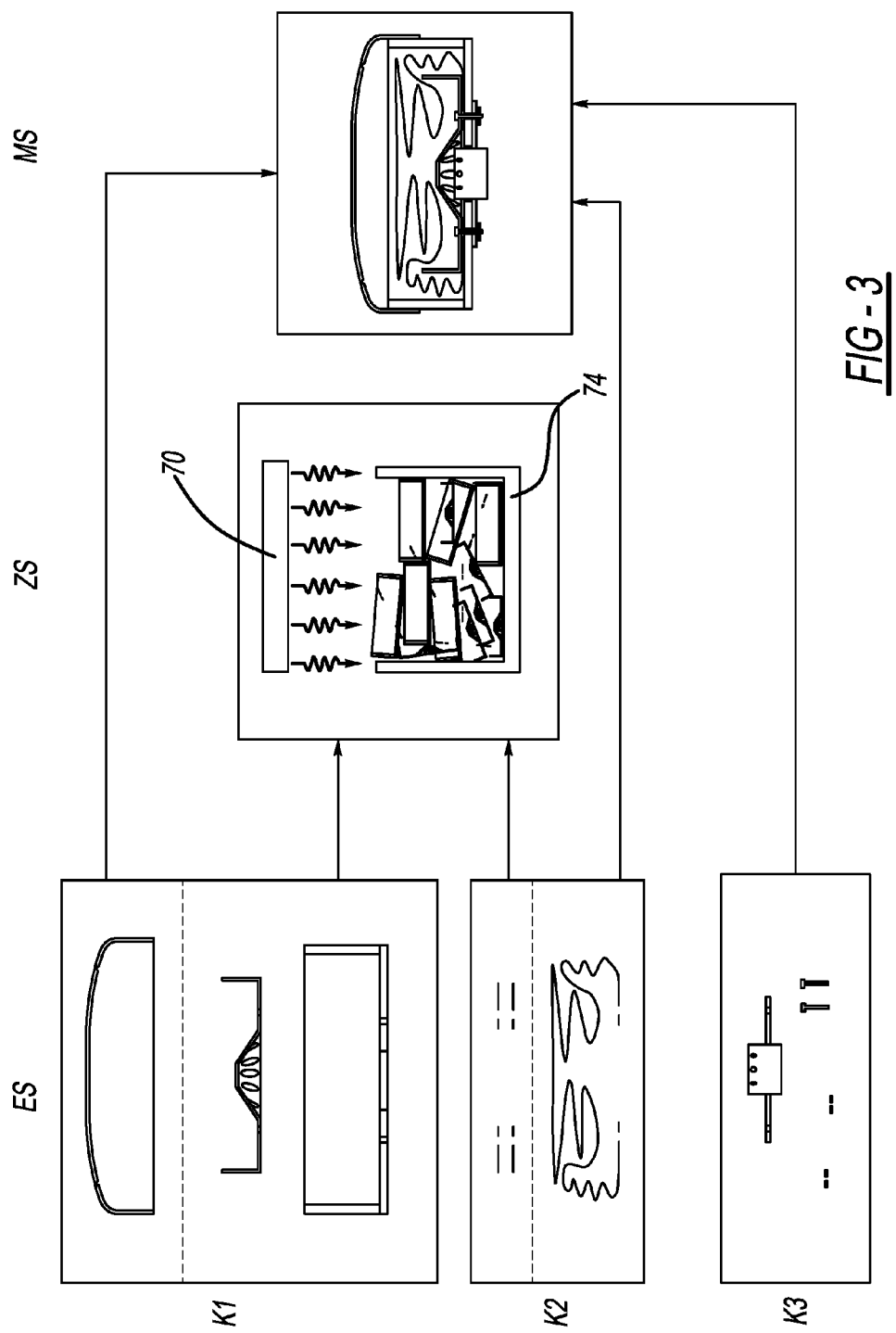
FIG. 3 is a block diagram of the manufacturing steps.
Figure 4:
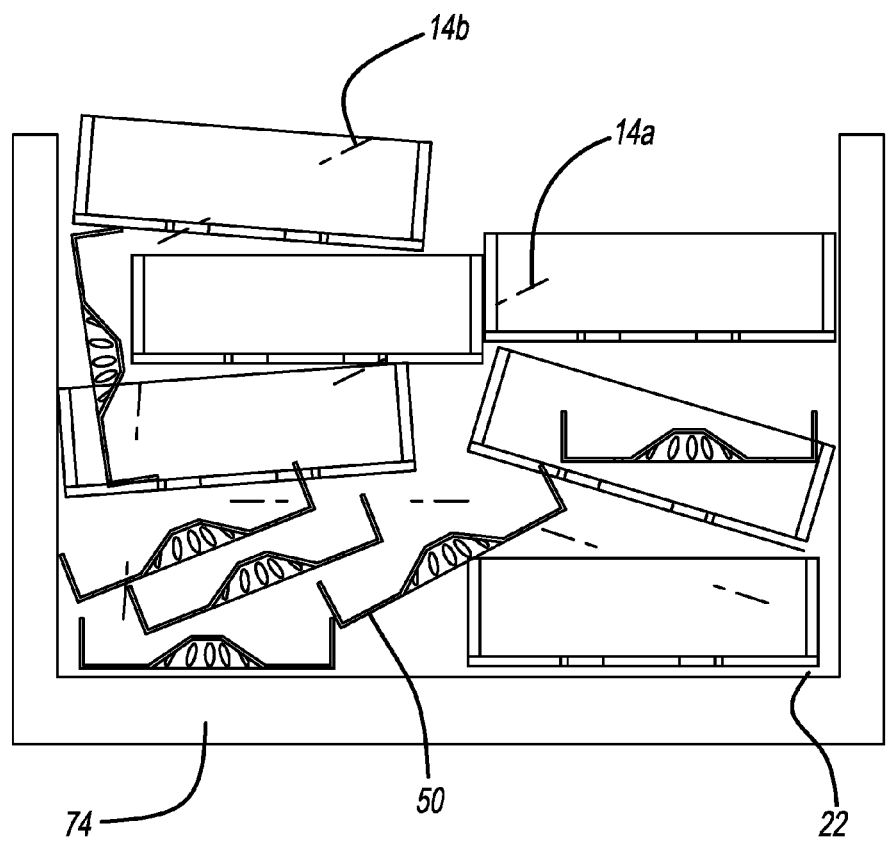
FIG. 4 is an enlarged depiction of the manufacturing step of radiation crosslinking from FIG. 3.

The manufacturing process of the air bag module is now described with reference to FIG. 3. For this purpose, it is practical to view all the components of the air bag module as divided in three component groups. In this scheme, the component group K1 contains all the components which are manufactured in an injection molding process. In the present exemplary embodiment, this K1 component group contains all the components of the receiving and retaining element 20. The K2 component group contains all the components which consist of a plastic fabric or of a plastic laminate, which, in this case, are the air bag pillow 11 and the reinforcing layers 14a, 14b. The K3 component group contains all the other components, in particular those which are made wholly or in part of metal. Here, they are the gas generator 40, the bolts 60 and the nuts 62. The above-mentioned composite parts would also belong to the K1 component group, in so far as composite parts are used.

The provision of all these components is in summary designated as the first manufacturing step ES. In the prior art, the assembly step MS immediately follows this first manufacturing step. According to the present invention, an intermediate step ZS is provided for a part of the components, namely the step of radiation crosslinking or crosslinking (these two concepts are used synonymously here). In the shown exemplary embodiment, this intermediate step concerns the housing 22, the retaining, diffusing and deflecting element 50 and the reinforcing layers 14a, 14b, that is, only a part of the two component groups K1 and K2. This is important here, since not all components of these two component groups are suitable for radiation cross-linking. That is due to the fact that, among other things, radiation crosslinking not only leads to an increase of thermal stability but also to an increase in brittleness. An increase in brittleness of the entire cover element 30 and of the entire air bag 10 is, however, undesired; in addition, radiation crosslinking of plastic fabric is not possible, as has already been mentioned.

The corresponding elements are made of a plastic that is suitable for radiation crosslinking; this can be achieved, for example, in that a so-called crosslinking activator (master batch) is added to the material to be processed prior to injection molding (in the case of the housing 22 and of the retaining, diffusing and deflecting element 50) or prior to the production of the laminate (in the case of the reinforcement layers 14a, 14b).

In the shown exemplary embodiment, a plurality of individual elements to be irradiated is collected in a container 74 for the manufacturing step of radiation crosslinking and irradiated with x-ray, gamma or beta rays therein. A radiation generator 70 which, for example, can be an x-ray or electron tube, is used for this purpose. As a rule, it is possible to irradiate different individual elements in a common container 74; a "homogeneous" irradiation is, of course, also possible. Since rays with a relatively long range are normally used, the individual elements to be irradiated can lie loose in the container 74; nevertheless, uniform crosslinking should be achieved.

After completion of the irradiation, the final assembly of all the individual components of the air bag module can be carried out as usual.

As already mentioned, composite parts consisting of plastic and metal can also be radiation crosslinked, since the metal elements do not significantly obstruct the irradiation. Radiation crosslinking can even result in another advantage in this case: during the manufacture of such composite parts, so-called joint lines can form in the proximity of the parts with metal inserts during injection molding. The strength of these joint lines can be increased, by subsequent radiation crosslinking, and the integrity of the composite part be improved in this way.

According to the current state of knowledge, the procedure described above and the use of radiation cross-linking described above is the preferred possible application of the invention which is especially based on the fact that the additional manufacturing expenditure is relatively low. Based on the second exemplary embodiment, a second possible process, however, is still to be described, where the application of radiation crosslinking is different: in addition to the previously described effect, namely the increase in thermal stability, radiation crosslinking has another effect in that the crosslinked plastic has an increased brittleness compared to the corresponding non-crosslinked plastic, as has already been mentioned. This increase in brittleness can be used for a specific purpose, for example, in order to improve the breaking of the cover element 30 along its predetermined breaking line 36. Since in the case of this application, however, it is in general undesirable that an entire component, namely the cover element 30 here, has an increased brittleness, selective irradiation is necessary in the concretely shown exemplary embodiment, namely the area of the predetermined breaking line 36. In order to achieve such a selective irradiation, the components (namely the cover elements 30) to be irradiated are placed exactly positioned on a conveyor 76. This conveyor 76 conveys the cover elements 30 step by step (that is discontinuously) to a position in which the area of the respective predetermined breaking line 36 is irradiated. In order to achieve that only a narrow area around the predetermined breaking line 36 is irradiated, a shielding 72 in the form of a collimator is provided. Since the irradiation of the other areas of the cover elements 30 is not desired, and since a permanent activation and deactivation of the radiation generator 70 is usually not possible, a mechanical shutter 78 is preferentially provided in the beam path.

While the above description constitutes the preferred embodiment of the present invention, it will be appreciated that the invention is susceptible to modification, variation and change without departing from the proper scope and fair meaning of the accompanying claims.

The invention claimed is:

1. An air bag module comprising an air bag, a receiving and retaining element to receive and hold the air bag, and an inflator to fill the air bag, wherein the receiving and retaining element at least in part consists of a radiation crosslinked plastic, the receiving and retaining element being made of at least two individual parts, one of the at least two individual parts comprising a radiation-crosslinked plastic, and one of the at least two individual parts is a cover comprising a non-radiation-crosslinked plastic.

2. The air bag module according to claim 1, further comprising in that the plastic of each individual part of the receiving and retaining element consists either completely of a radiation crosslinked plastic or completely of a non-radiation crosslinked plastic.

3. The air bag module according to claim 1, further comprising that at least one individual part is a metal-plastic composite part.

4. The air bag module according to claim 1, further comprising that the receiving and retaining element has at least one individual part that in sections consists of a radiation crosslinked plastic and in sections of a non-radiation crosslinked plastic.

5. An air bag module according to claim 1, further comprising that the receiving and retaining element has a base on which a gas generator used as an inflator is held, and in that at least an area of the base on which the gas generator is held consists of a radiation crosslinked plastic.

6. The air bag module according to claim 1 wherein the radiation crosslinked plastic is a thermoplastic.

7. The air bag module according to claim 1 wherein the non-radiation crosslinked plastic is a thermoplastic.

8. The air bag module according to claim 1 wherein the receiving and retaining element comprises a housing which comprises a radiation-crosslinked plastic.

9. The air bag module according to claim 1 wherein the receiving and retaining element comprises a retaining, diffusing, and deflecting element, which comprises a radiation-crosslinked plastic.

10. The air bag module according to claim 1 wherein the receiving and retaining element comprises a housing and a retaining, diffusing, and deflecting element, each of which comprises a radiation-crosslinked plastic.

11. A procedure to manufacture an air bag module, comprising the steps of providing at least one component of the air bag module at least in part of a plastic that can be radiation crosslinked, and that this component is exposed to ionizing radiation in order to achieve radiation crosslinking prior to the final assembly of the air bag module, the at least one component being at least one of a housing for a receiving and retaining element; a retaining, diffusing, and deflecting element; and a reinforcing layer for surrounding an inflation inlet of an air bag pillow.

12. The procedure according to claim 11, further comprising exposing the entire component to ionizing radiation.

13. The procedure according to claim 12, further comprising exposing a plurality of such components to ionizing radiation in a container.

14. The procedure according to claim 11, further comprising individually exposing the component to ionizing radiation.

15. The procedure according to claim 14, further comprising exposing the component to ionizing radiation only in sections so that it is selectively radiation crosslinked.

* * * * *